(12) United States Patent
Vansa (10) Patent No.: US 10,922,310 B2
(45) Date of Patent: Feb. 16, 2021

(54) MANAGING DATA RETRIEVAL IN A DATA GRID

(71) Applicant: RED HAT, INC., Raleigh, NC (US)

(72) Inventor: Radim Vansa, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 326 days.

(21) Appl. No.: 15/885,096

(22) Filed: Jan. 31, 2018

(65) Prior Publication Data
US 2019/0236181 A1    Aug. 1, 2019

(51) Int. Cl.
| G06F 16/24 | (2019.01) |
| G06F 16/21 | (2019.01) |
| G06F 16/22 | (2019.01) |
| G06F 16/23 | (2019.01) |

(52) U.S. Cl.
CPC .............. *G06F 16/24* (2019.01); *G06F 16/21* (2019.01); *G06F 16/22* (2019.01); *G06F 16/23* (2019.01)

(58) Field of Classification Search
None
See application file for complete search history.

(56) References Cited

U.S. PATENT DOCUMENTS

| 7,010,622 B1* | 3/2006 | Bauer ................. H04L 41/0233 370/395.31 |
| 8,375,001 B2* | 2/2013 | San Martin Arribas ..................... G06F 16/278 707/636 |
| 9,280,591 B1 | 3/2016 | Kharatishvili et al. |
| 9,317,576 B2 | 4/2016 | Merriman et al. |
| 9,355,117 B1 | 5/2016 | Brocco et al. |
| 2013/0179480 A1 | 7/2013 | Agarwal et al. |
| 2013/0226891 A1* | 8/2013 | Markus ............... G06F 16/2329 707/703 |

FOREIGN PATENT DOCUMENTS

WO    2010/148822 A1    12/2010

OTHER PUBLICATIONS

"Hazelcast 3.7 Reference Manual," Aug. 17, 2016, http://docs.hazelcast.org/docs/3.7/manual/html-single/index_html#creating-near-cashe-for-map.
Dice, D., "Biased Locking in HotSpot," Oracle, Aug. 18, 2006, https://blogs.oracle.com/dave/entry/biased_locking_in_hotspot.
Surtani, M. et al., Infinispan 8.2 User Guide, http://infinispan.org/docs/8.2.x/user_guide/user_guide.html#KeyAffinityService.
Vansa, R., U.S. Appl. No. 15/426,140, filed Feb. 7, 2017.

* cited by examiner

*Primary Examiner* — Giuseppi Giuliani
(74) *Attorney, Agent, or Firm* — Kilpatrick Townsend & Stockton LLP (57) ABSTRACT

Data retrieval can be managed in a data grid. For example, a computing device can receive a write command from a second node in the data grid, the write command being for storing a second version of data. In response to the write command, the computing device can use a database to determine that a first version of the data is to be locally served by a first node in the data grid. The computing device can then transmit a communication that causes the first node to switch from (i) locally serving the data, to (ii) obtaining and serving the second version of the data from a remote node, such as the second node. The computing device can then update the database to indicate that the second version of the data is to be locally served by the second node.

14 Claims, 7 Drawing Sheets

MANAGING DATA RETRIEVAL IN A DATA GRID

TECHNICAL FIELD

The present disclosure relates generally to storage access and control. More specifically, but not by way of limitation, this disclosure relates to managing data retrieval in a data grid.

BACKGROUND

A data grid is a data management system that includes multiple nodes in communication with one another via a network (e.g., the Internet) for collectively managing and processing information. Examples of a node can include a computing device, a server, a virtual machine, or any combination of these. Typically, a data grid will have a node that serves as a centralized location for storing the most up-to-date version of data. This node can be referred to as a "primary node" for the data. Other nodes in the data grid can respond to requests for the data (e.g., from client devices) by retrieving the data from the primary node and forward the data to the requestor. This can help ensure that all the nodes in the data grid are communicating the most up-to-date version of the data.

As a particular example, a node in the data grid can determine that a key-value pair is to be stored in the data grid. This node can be referred to as an "originator node," because it is the node from which the data originates. The originator node can transmit the key-value pair to a primary node in the data grid, and the primary node can store the key-value pair. Thereafter, various nodes in the data grid can retrieve the key-value pair from the primary node as needed. And, as other nodes in the data grid generate updated versions of the key-value pair, they can store the updated versions of the key-value pair with the primary node to help ensure that the primary node remains up-to-date.

DETAILED DESCRIPTION

There can be disadvantages to centrally storing data on a primary node in a data grid. For example, every time the other nodes in the data grid need to obtain the data, they may need to perform a remote procedure call to read the data from the primary node. And remote procedure calls are relatively slow and increase the latency of the data grid.

Some examples of the present disclosure overcome one or more of the abovementioned issues by (i) storing a copy of data locally on an originator node as well as on a primary node, and (ii) configuring how the originator node serves the data based on whether or not the originator node has the most recent version of the data. By storing a copy of the data locally on the originator node, the originator node can respond to data requests by locally reading the data from a local memory, rather than performing a remote procedure call. This can improve the latency of the data grid, because a local read may take significantly less time to complete than a remote procedure call. For example, a local read may take on the order of nanoseconds to complete, whereas a remote procedure call may take on the order of milliseconds to complete. Also, by storing a copy of the data on both the originator node and the primary node, a back-up of the data is available to provide fault tolerance, for example, if the originator node or the primary node fails.

In some cases, the version of the data locally stored on the originator node may become outdated. For example, another node in the data grid may generate an updated version of the data and store the updated version of the data with the primary node. So, to prevent the originator node from serving the outdated version of the data, the primary node can maintain a database indicating which node is locally serving the data (e.g., obtaining the data from a local memory and transmitting the data to a requestor of the data). The primary node can access the database, determine that the originator node is locally serving an outdated version of the data, and transmit a communication to the originator node. The communication can cause the originator node to switch from (i) locally serving the data, to (ii) responding to requests for the data by obtaining the data from the primary node and forwarding the data to the requestor. This can help ensure that the originator node is serving the most up-to-date version of the data.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
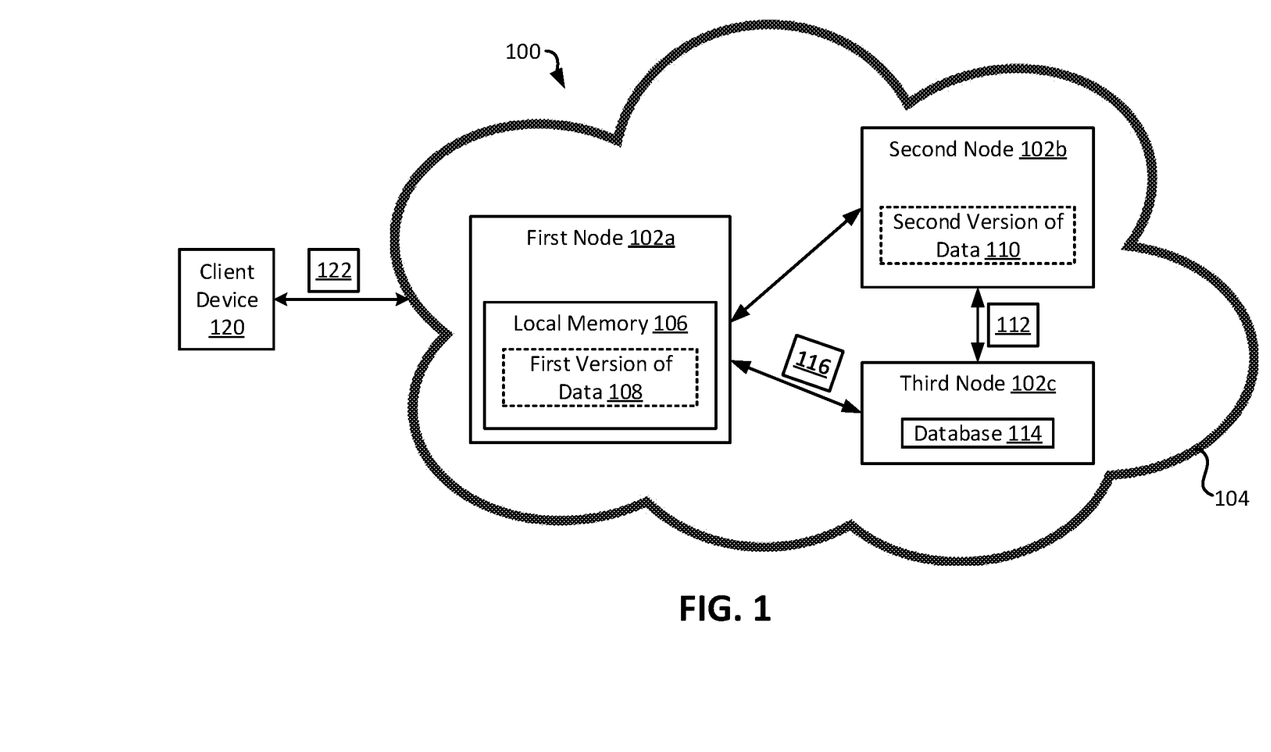
FIG. 1 is a block diagram of an example of a system for managing data retrieval in a data grid according to some aspects.

FIG. 1 is a block diagram of an example of a system 100 for managing data retrieval in a data grid 104 according to some aspects. The data grid 104 includes a first node 102a, a second node 102b, and a third node 102c in communication with one another.

The first node 102a can determine that data is to be stored in the data grid 104. So, the first node 102a can also communicate the data to the third node 102c. The third node 102c can store the data in a local memory (which is not shown in FIG. 1 for simplicity) and serve as a primary node for the data from which the other nodes in the data grid 104 can obtain the data, as needed. The first node 102a can also store a copy of the data in a local memory 106. Examples of the local memory 106 can include as a cache memory, random access memory (RAM), or a hard disk.

Subsequently, the first node 102a can receive a request 122 for the data from a client device 120 and respond to the request 122 by reading the data from the local memory 106 and serving the data to the client device 120. In this manner, the first node 102a can serve the data to the client device 120, without having to perform a remote procedure call to first obtain the data from another node, such as the third node 102c. This can reduce the latency of the data grid 104, particularly in circumstances where the data is repeatedly requested from the same node (e.g., the first node 102a) due to load balancing and other factors. In contrast, the second node 102b may receive a request 122 for the data from the client device 120, obtain the data from the third node 102c, and serve (e.g., transmit) the data to the client device 120.

During operation of the data grid 104, the second node 102b may later determine (e.g., receive or generate) a second version of the data 110. For example, the first version of the data 108 can be a key-value pair that has a key and a first value, and the second node 102b can determine a second version of the data 110 that includes the key and a second value that is different from the first value. So, the second node 102b can transmit a write command 112 to the third node 102c that causes the third node 102c to store a copy of the second version of the data 110. This can help ensure that the third node 102c has the most up-to-date version of the data. This copy can also serve as a duplicate copy of the second version of the data 110 to provide fault tolerance. The second node 102b can also locally store the second version of the data 110 in its own local memory (which is not shown in FIG. 1 for simplicity). The second node 102b can then configure one or more of its settings such that it responds to a request 122 for the data by serving its own local version of the data to the client device 120. This may enable the second node 102b to respond to the request 122 from the client device 120, without having to perform a remote procedure call to the third node 102c.

Next, to prevent the first node 102a from serving the first version of the data 108, which may be outdated, the third node 102c can transmit a communication 116 to the first node 102a. The communication 116 can cause the first node 102a to switch from a first setting to a second setting. In the first setting, the first node 102a can respond to a request 122 from the client device 120 by serving the locally stored, first version of the data 108. In the second setting, the first node 102a can respond to a request 122 from the client device 120 by obtaining the second version of the data 110 from a remote node (e.g., the second node 102b or the third node 102c) and serving the second version of the data 110. Switching from the first setting to the second setting can help ensure that regardless of whether the request 122 is transmitted to the first node 102a or the second node 102b, the client device 120 receives the second version of the data 110.

The above process may repeat as other nodes in the data grid 104 determine different versions of the data. For example, if a fourth node (not shown) in the data grid 104 generates another version of the data, it may locally store a copy of the other version of the data and transmit a write command 112 to the third node 102c. In response to the write command 112, the third node 102c can store a copy of the other version of the data and transmit a communication 116 to the second node 102b. The communication 116 can cause the second node 102b to switch from the first setting to the second setting. And so on.

To keep track of which node to send the communication 116 to, the third node 102c can maintain a database 114. The database 114 can include relationships between (i) pieces of data and (ii) which nodes in the data grid 104 are locally serving the pieces of data. As a particular example, the database 114 can initially indicate that the first node 102a is locally serving the first version of the data 108. After the second node 102b generates the second version of the data 110 and transmits the write command 112 to the third node 102c, the third node 102c can determine that the first node 102a is locally serving the data, transmit the communication 116 to the first node 102a, and update the database 114 to reflect that the second node 102b is now locally serving the second version of the data 110. And after the fourth node generates the newer version of the data and transmits the write command 112 to the third node 102c, the third node 102c can determine that the second node 102b is locally serving the data, transmit the communication 116 to the second node 102b, and update the database 114 to reflect that the fourth node is now locally serving the newer version of the data 110. By tracking which node in the data grid 104 is locally serving the data, the third node 102c can determine to which node in the data grid 104 to transmit the communication 116.

Figure 2:
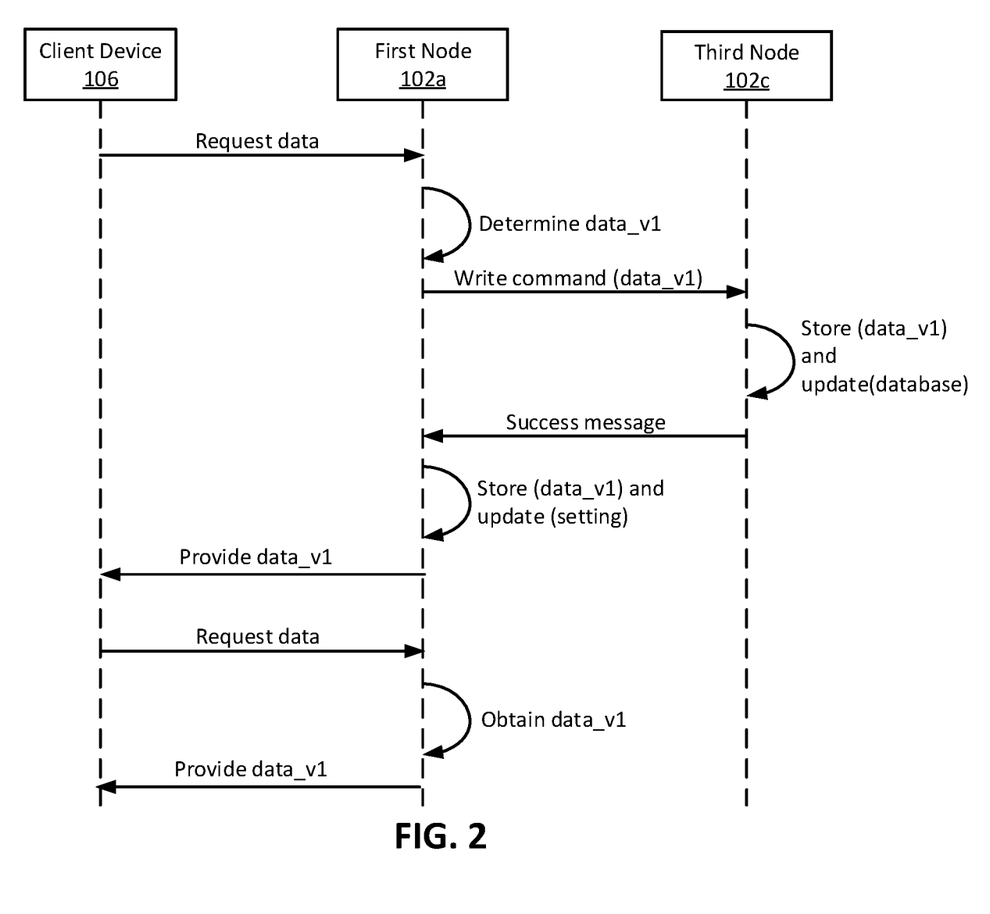
FIG. 2 is a sequence diagram of an example of storing a first version of data according to some aspects.

FIG. 2 is a sequence diagram of an example of storing the first version of the data 108 according to some aspects. Other examples can include more steps, fewer steps, different steps, or a different order of the steps than are depicted in FIG. 2. The steps of FIG. 2 are described below with reference to the components discussed above with regard to FIG. 1.

The process begins with the client device 120 transmitting a request 122 for data to the first node 102a. If the data does not yet exist, the first node 102a can determine (e.g., generate) the first version of the data 108, which is designated as data_v1 in FIG. 2, and transmit a write command 112 for the first version of the data 108 to the third node 102c. The third node 102c can store the first version of the data 108 and update a database 114 to reflect that the first version of the data 108 is to be locally served by the first node 102a. The third node 102c may then transmit a success message back to the first node 102a indicating that the third node 102c successfully stored the first version of the data 108. The first node 102a also stores a local copy of the first version of the data 108 in local memory 106 and updates a setting to cause the first node 102a to respond to a future request for the data by locally serving the first version of the data 108. The first node 102a may then transmit the first version of the data 108 to the client device 120.

At a subsequent time, the client device 120 may again request the data from the first node 102a. In response, the first node 102a can obtain the first version of the data 108 from the local memory 106 and provide the first version of the data 108 to the client device 120, without having to communicate with the third node 102c.

Figure 3:
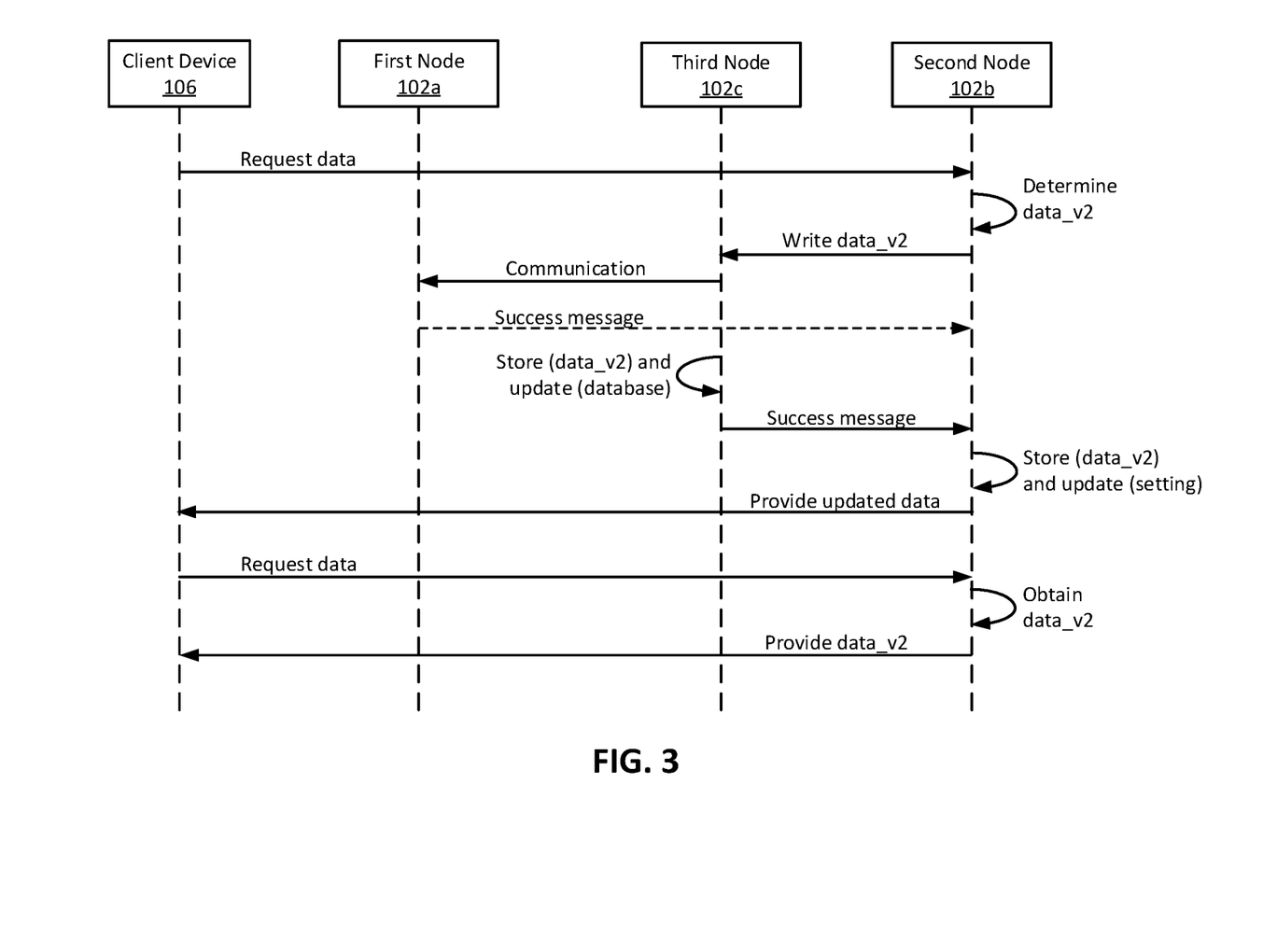
FIG. 3 is a sequence diagram of an example of storing a second version of data according to some aspects.

One example of a process in for storing the second version of the data 110 is shown in FIG. 3. Other examples can include more steps, fewer steps, different steps, or a different order of the steps than are depicted in FIG. 3. The steps of FIG. 3 are described below with reference to the components discussed above with regard to FIG. 1.

The process begins with the client device 120 transmitting a request 122 for data to the second node 102b. The second node 102b may respond by determining a second version the data 110, which is designated as data_v2 in FIG. 3, and transmitting a write command 112 for the second version of the data 110 to the third node 102c. The third node 102c can receive the write command 112 and responsively transmit a communication 116 to the first node 102a. The communication 116 can cause the first node 102a to update a setting such that the first node 102a responds to future requests for the data by obtaining the second version of the data 110 from the third node 102c, rather than locally serving the first version of the data 108. After updating the setting, the first node 102a may transmit a success message back to the second node 102b indicating that the first node 102a is no longer locally serving the first version of the data 108. This success message may be transmitted a synchronously, as indicated by the dashes in the arrow. In some examples, the third node 102c also stores the second version of the data 110, and updates the database 114 to reflect that the second version of the data 110 is to be locally served by the second node 102b. The third node 102c may then transmit a success message to the second node 102b indicating that the third node 102c successfully stored the second version of the data 110. In some examples, the second node 102b also stores a local copy of the second version of the data 110 in local memory and updates a setting to cause the second node 102b to respond to a future request for the data by locally serving the second version of the data 110. The second node 102b may then transmit the second version of the data 110 to the client device 120.

At a subsequent time, the client device 120 may again request 122 the data from the second node 102b. In response to the request 122, the second node 102b can obtain the second version of the data 110 from the local memory 106 and provide the second version of the data 110 to the client device 120, without having to communicate with the third node 102c. And if the client device 120 requests the data from the first node 102a, the first node 102a responds by obtaining the second version of the data 110 from the third node 102c for the second node 102b) and transmitting the second version of the data 110 to the client device 120.

In the example shown in FIG. 3, the portion of the process that is dedicated to managing how the data is to be served by the first node 102a and second node 102b takes three transmissions to complete. These three transmissions include the "write data_v2" transmission, the "communication" transmission, and the "success message" transmission from the third node 102c to the second node 102b. This may add a small amount of latency to the data grid 104 up-front, but the overall latency in the data grid 104 is generally reduced as a result of locally serving the data from the second node 102b thereafter.

Figure 4:
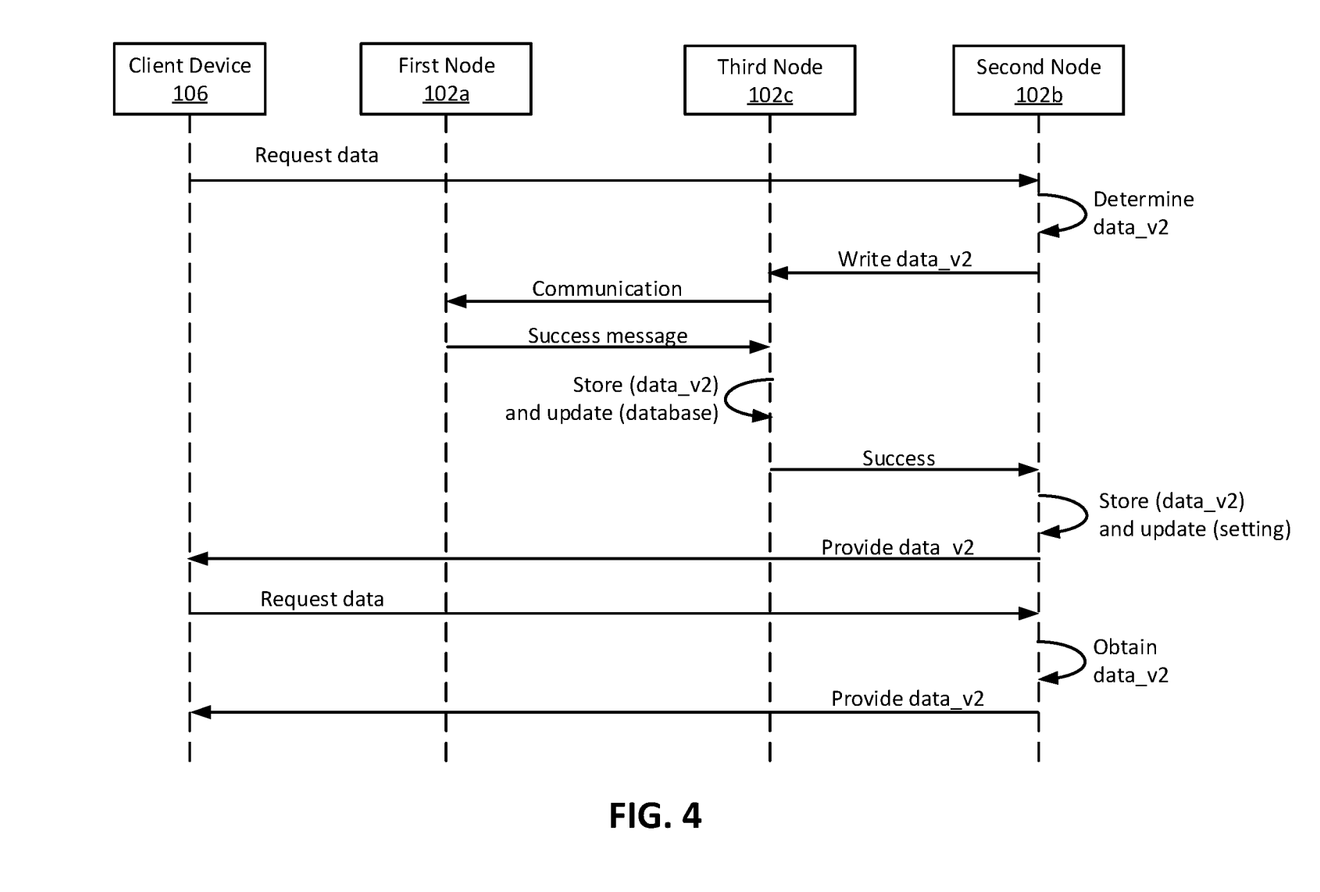
FIG. 4 is a sequence diagram showing another example of storing a second version of data according to some aspects.

Other examples may involve more or fewer transmissions, which may result in a different amount of up-front latency in the data grid 104. FIG. 4 is an example of a process that has more transmissions and therefore a higher up-front latency than the example shown in FIG. 3.

As shown in FIG. 4, the client device 120 can transmit a request 122 for data to the second node 102b. The second node 102b may respond by determining a second version the data 110, which is designated as data_v2 in FIG. 4, and transmitting a write command 112 for the second version of the data 110 to the third node 102c. The third node 102c can receive the write command 112 and responsively transmit a communication 116 to the first node 102a. The communication 116 can cause the first node 102a to update a setting such that the first node 102a responds to future requests for the data by obtaining the second version of the data 110 from the third node 102c (or the second node 102b), rather than locally serving the first version of the data 108. After updating the setting, the first node 102a may transmit a success message back to the third node 102c indicating that the first node 102a is no longer locally serving the first version of the data 108. In some examples, the third node 102c also stores the second version of the data 110 and updates the database 114 to reflect that the second version of the data 110 is to be locally served by the second node 102b. The third node 102c may then transmit a success message to the second node 102b indicating that the third node 102c successfully stored the second version of the data 110. The rest of the process can be similar to the process described with respect to FIG. 3.

In this example, the portion of the process that is dedicated to managing how the data is to be served by the first node 102a and second node 102b takes four transmissions to complete. These four transmissions include the "write data_v2" transmission, the "communication" transmission, and the first 'success message' transmission from the first node 102a to the third node 102c, and the second "success message" transmission from the third node 102c to the second node 102b. This may add more latency to the data grid 104 up-front than the example discussed with respect to FIG. 3, but the overall latency in the data grid 104 is still generally reduced as a result of locally serving the data from the second node 102b thereafter.

Figure 5:
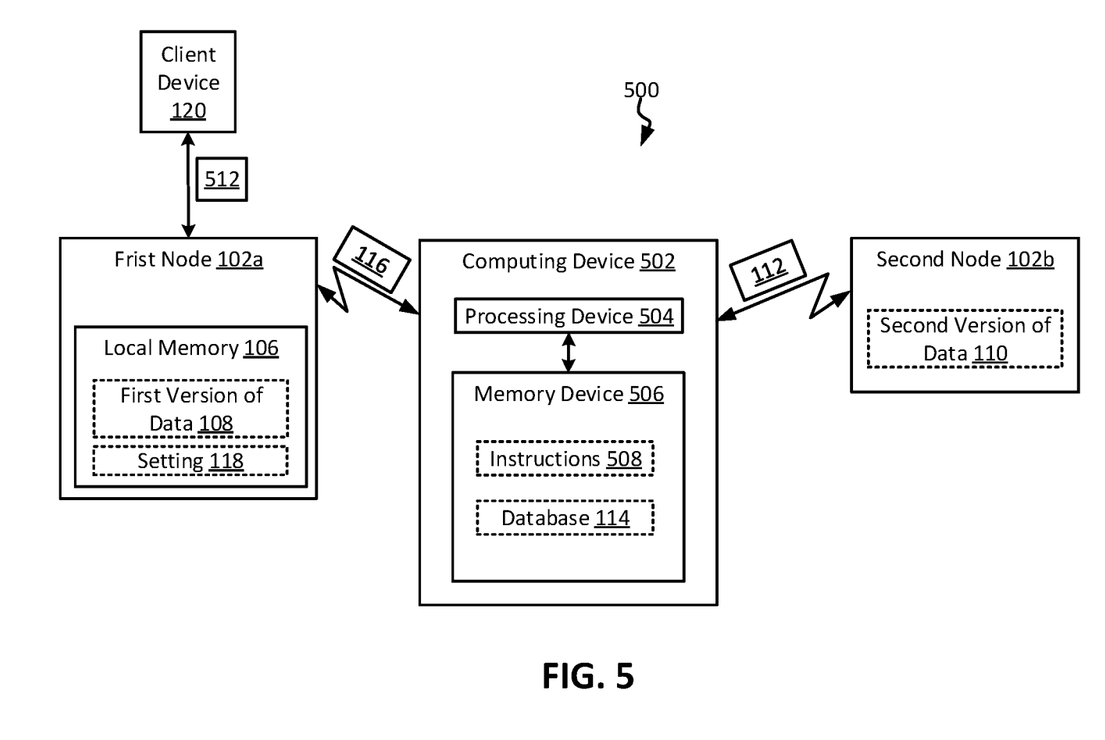
FIG. 5 is a block diagram of another example of a system for managing data retrieval in a data grid according to some aspects.

FIG. 5 is a block diagram of another example of a system 500 for managing data retrieval in a data grid according to some aspects. The system 500 includes a computing device 502 in communication with a first node 102a and a second node 102b in a data grid.

The computing device 502 includes processing device 504 communicatively coupled to a memory device 506. The processing device 504 can include one processing device or multiple processing devices. Non-limiting examples of the processing device 504 include a Field-Programmable Gate Array (FPGA), an application-specific integrated circuit (ASIC), a microprocessor, etc. The processing device 504 can execute instructions 508 stored in the memory device 506 to perform operations. In some examples, the instructions can include processor-specific instructions generated by a compiler or an interpreter from code written in any suitable computer-programming language, such as C, C++, C #, etc.

The memory device 506 can include one memory device or multiple memory devices. The memory device 506 can be non-volatile and may include any type of memory device that retains stored information when powered off. Non-limiting examples of the memory device 506 include electrically erasable and programmable read-only memory (EEPROM), flash memory, or any other type of non-volatile memory. In some examples, at least some of the memory device can include a medium from which the processing device 504 can read instructions 508. A computer-readable medium can include electronic, optical, magnetic, or other storage devices capable of providing the processing device 504 with computer-readable instructions or other program code, Non-limiting examples of a computer-readable medium include magnetic disk(s), memory chip(s), ROM, random-access memory (RAM), an ASIC, a configured processor, optical storage, or any other medium from which a computer processor can read the instructions 508.

In some examples, the computing device 502 can be the third node 102c in FIG. 1. In such an example, the second node 102b may determine a second version of data 110 and transmit a write command 112 to the computing device 502. In response to the write command 112, the computing device 502 can update a database 114 to reflect that the second version of the data 110 is to be locally served by the second node 102b. The computing device 502 can also transmit a communication 116 to the first node 102a. The communication 116 can cause the first node 102a to update a setting 118 such that the first node 102a responds to subsequent requests 512 for the data (e.g., from the client device 120) by obtaining the second version of data 110 from the computing device 502, rather than from the local memory 106, and serving the second version of data 110 to the requestor. This can prevent the first version of the data 108, which may be outdated, from being served to the requestor.

In some examples, the computing device 502 can monitor the size of the database 114 to prevent it from becoming too large. And if the database meets or exceeds a predefined size limit, the computing device 502 may delete one or more existing entries in the database 114 before inserting new entries into the database. For example, the second node 102*b* may determine that a new piece of data is to be stored in the data grid, and then transmit a write command 112 to the computing device 502 for storing a copy of the new piece of data with the computing device 502. If the database 114 meets or exceeds a predefined size limit, the computing device 502 may remove an existing entry for another piece of data in the database 114 to make room for a new entry for the new piece of data. The computing device 502 can also transmit communication(s) 116 to one or more nodes on which the other piece of data is locally stored to cause those nodes to delete their respective copies of the other piece of data. Monitoring the size of the database 114 in this manner can help prevent a variety of memory-related issues when there are hundreds of thousands or millions of pieces of data in the data grid.

Figure 6:
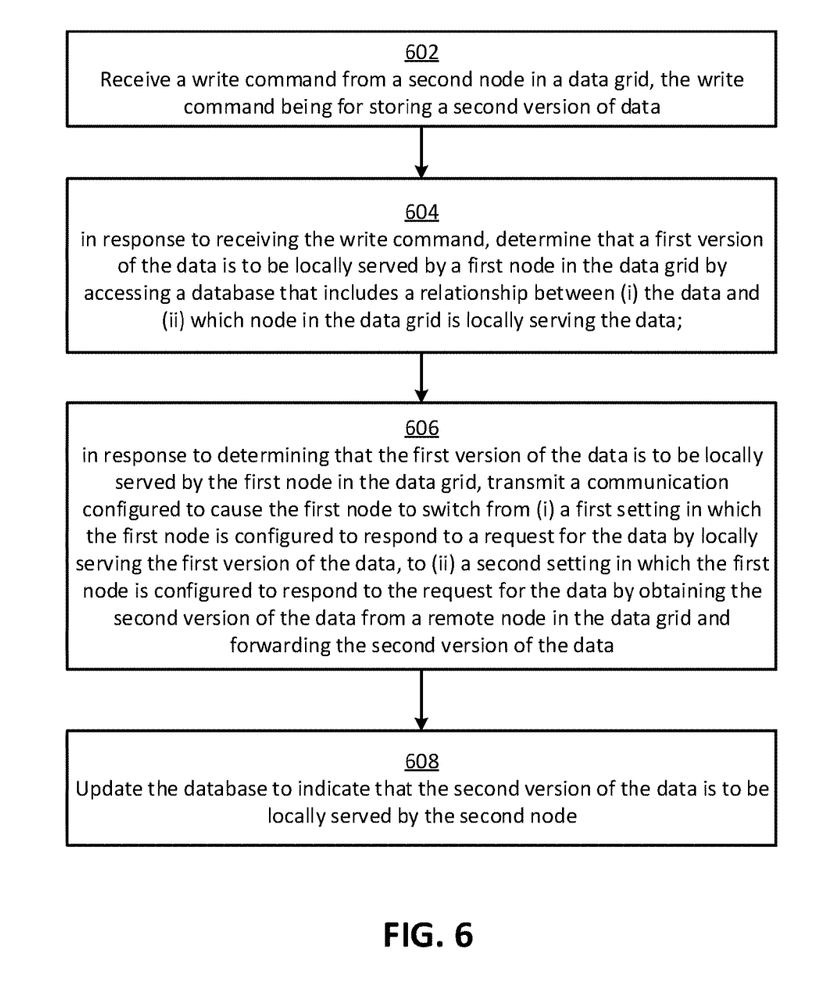
FIG. 6 is a flow chart showing an example of a process for managing data retrieval in a data grid according to some aspects.

In some examples, the computing device 502 can implement the process shown in FIG. 6. Other examples can include more steps, fewer steps, different steps, or a different order of the steps than are depicted in FIG. 6. The steps of FIG. 6 are described with reference to the components discussed above with regard to FIG. 5.

In block 602, a processing device 504 receives a write command 112 from a second node 102*b* in a data grid. The write command 112 can be for storing a second version of data 110. The write command 112 can include one or more commands configured to cause the second version of the data 110 to be stored in a memory device 506 that is communicatively coupled to the processing device 504.

In block 604, the processing device 504 determines that a first version of the data 108 is to be locally served by a first node 102*a* in the data grid by accessing a database 114 that includes a relationship between (i) the data and (ii) which node in the data grid is locally serving the data. In some examples, the processing device 504 determines that the first version of the data 108 is to be locally served by the first node 102*a* in response to receiving the write command.

In some examples, the database 114 can include a lookup table, a location in memory device 506, or another structure in which relationships between information can be stored. As a particular example, the database 114 can include one column listing pieces of data and another column listing the nodes that in the data grid that are to locally serve the pieces of data. Each row in the lookup table can be for a respective piece of data and indicate which node is to locally serve the piece of data.

In block 604, the processing device 504 transmits a communication 116 configured to cause the first node 102*a* to switch from (i) a first setting in which the first node 102*a* is configure to respond to a request 122 for the data by locally serving the first version of the data 108, to (ii) a second setting in which the first node 102*a* is configured to respond to the request for the data by obtaining the second version of the data 110 from a remote node (e.g., the second node 102*b* or the computing device 502) in the data grid and forwarding the second version of the data 110. The processing device 504 can transmit the communication 116 in response to determining that the first version of the data 108 is to be locally served by the first node 102*a* in the data grid.

In some examples, switching from the first setting to the second setting can involve changing the values of one or more settings, such as changing the value of the setting 118 from a first value to a second value. Additionally or alternatively, switching from the first setting to the second setting can involve adding or deleting one or more existing settings.

In block 608, the processing device 504 updates the database 114 to indicate that the second version of the data 110 is to be locally served by the second node 102*b*. For example, the processing device 504 can update a row of the database 114 that includes the data and an identifier of the node that is to locally serve the data. The processing device 504 can update the row to have an identifier (e.g., Internet Protocol (IP) address or name) of the second node 102*b*.

Figure 7:
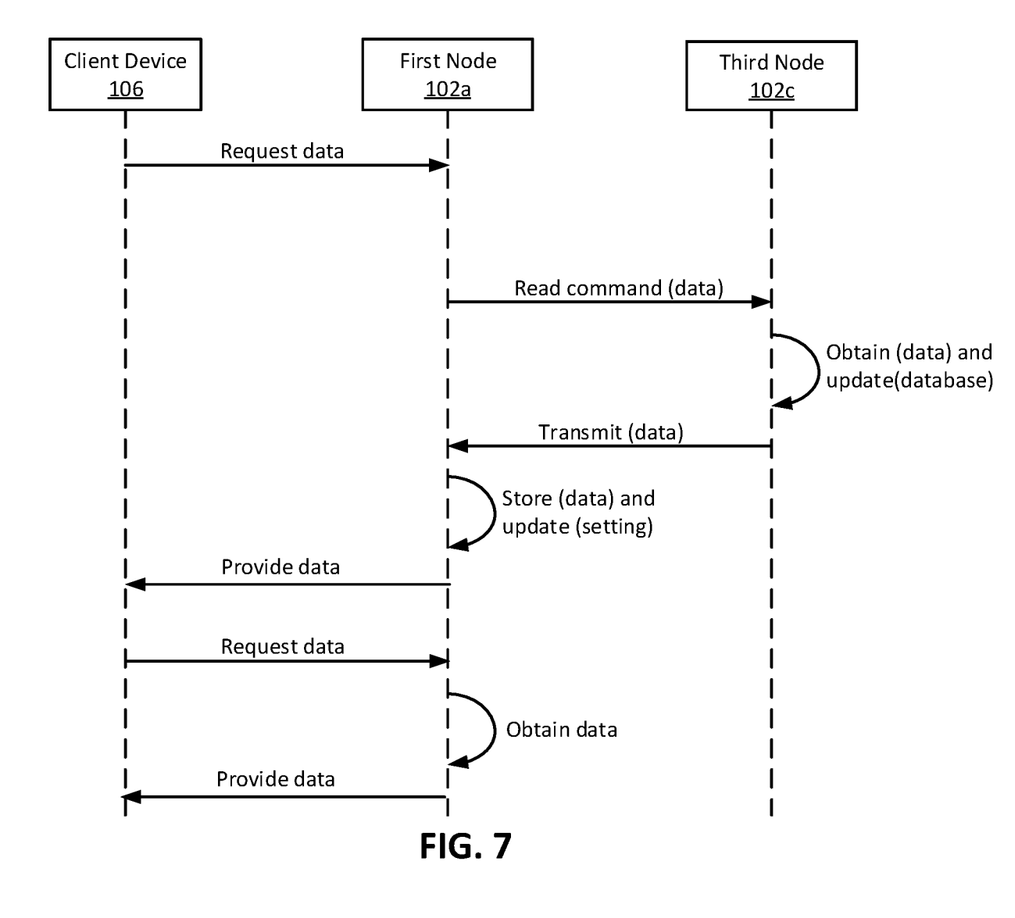
FIG. 7 is a sequence diagram of another example of managing data retrieval in a data grid according to some aspects.

In some examples, multiple nodes in the data grid can simultaneously be configured to locally serve data. For example, multiple nodes in the data grid can obtain the most up-to-date version of the data from a primary node for the data, store respective local copies of the most-up-to-date version of the data, and update respective settings to enable local serving of the data. The primary node can then update the database 114 to reflect that these nodes are all locally serving the data. One example of a portion of such a process is shown in FIG. 7. Other examples can include more steps, fewer steps, different steps, or a different order of the steps than are depicted in FIG. 7. The steps of FIG. 7 are described below with reference to the components discussed above with regard to FIG. 1.

The process begins with the client device 120 transmitting a request 122 for data to the first node 102*a*. If the first node 102*a* does not have the data, the first node 102*a* can transmit a read command 112 for the data to the third node 102*c*. The third node 102*c* can obtain the data (e.g., from a local memory), update a database 114 to reflect that the data is to be locally served by the first node 102*a*, and transmit the data back to the first node 102*a*. The first node 102*a* can then receive and store a local copy of the data in local memory 106. The first node 102*a* can also update a setting, for example, to a particular value that causes the first node 102*a* to respond to a future request for the data by locally serving the data. The first node 102*a* may then transmit the data to the client device 120.

At a subsequent time, the client device 120 may again request the data from the first node 102*a*. In response, the first node 102*a* can obtain the data from the local memory 106 and provide the data to the client device 120, without having to communicate with the third node 102*c*.

The process shown in FIG. 7 may be repeated for multiple nodes in the data grid 104 to enable the nodes to locally serve the data. This can enable the data to be locally served, regardless of which of the nodes receives the request 122 for the data, thereby reducing latency in the data grid 104.

After the multiple nodes are configured to locally serve the data, in some examples, the data may be subsequently updated. For example, the second node 102*b* may determine another version of the data and transmit the other version of the data to the third node 102*c*. So, to prevent the multiple nodes from potentially serving outdated data, the process of FIG. 3 or FIG. 4 can be implemented, except with respective communications 116 being sent to each of the multiple nodes. The respective communications 116 can cause the multiple nodes to switch settings such that they respond to future requests for the data by obtaining the data from the third node 102*c*, rather than locally serving the data.

The following illustrate various implementations in accordance with one or more aspects of the present disclosure.

Example 1 is a computing device comprising a processing device and a memory device on which instructions executable by the processing device are stored. The instructions can cause the processing device to receive a write command from a second node in a data grid, the write command being for storing a second version of data. The instructions can cause the processing device to, in response to receiving the write command, determine that a first version of the data is to be locally served by a first node in the data grid by accessing a database that includes a relationship between (i) the data and (ii) which node in the data grid is locally serving the data. The instructions can cause the processing device to, in response to determining that the first version of the data is to be locally served by the first node in the data grid, transmit a communication configured to cause the first node to switch from (i) a first setting in which the first node is configured to respond to a request for the data by locally serving the data, to (ii) a second setting in which the first node is configured to respond to the request for the data by obtaining the second version of the data from a remote node in the data grid and forwarding the second version of the data. The instructions can cause the processing device to update the database to indicate that the second version of the data is to be locally served by the node that transmitted the write command.

Example 2 is the computing device of Example 1, wherein the first version of the data is a key-value pair that includes a key and a first value. And the second version of the data is a second version of the key-value pair that includes the key and a second value that is different from the first value.

Example 3 is the computing device of any of Examples 1-2, wherein the memory device further comprises instructions that are executable by the processing device for causing the processing device to store the second version of the data in a local memory. The instructions can also cause the processing device to transmit a success message to the second node indicating that the second version of the data was stored in the local memory.

Example 4 is the computing device of any of Examples 1-3, wherein the write command is a first write command, and wherein memory device further comprises instructions that are executable by the processing device for causing the processing device to, prior to receiving the first write command: receive a second write command from the first node, the second write command being for storing the first version of the data; in response to receiving the second write command, determine that the data is not being locally served by any node in the data grid by accessing the database; and update the database to indicate that the first version of the data is to be locally served by the first node.

Example 5 is the computing device of Example 4, wherein memory device further comprises instructions that are executable by the processing device for causing the processing device to, subsequent to receiving the second write command and prior to receiving the first write command: store the first version of the data in a local memory; and transmit a success message to the first node indicating that the first version of the data was successfully stored in the local memory.

Example 6 is the computing device of any of Examples 1-5, wherein: locally serving the data comprises obtaining a version of the data from a local memory and serving the version of the data to a requestor of the data; the computing device forms a third node that is separate from the first node and the second node in the data grid; and the remote node is the first node or the third node.

Example 7 is a method comprising receiving, by a processing device, a write command from a second node in a data grid, the write command being for storing a second version of data. The method also includes, in response to receiving the write command, determining, by the processing device, that a first version of the data is to be locally served by a first node in the data grid by accessing a database that includes a relationship between (i) the data and (ii) which node in the data grid is locally serving the data. The method also includes, in response to determining that the first version of the data is to be locally served by the first node in the data grid, transmitting, by the processing device, a communication configured to cause the first node to switch from (i) a first setting in which the first node is configured to respond to a request for the data by locally serving the data, to (ii) a second setting in which the first node is configured to respond to the request for the data by obtaining the second version of the data from a remote node in the data grid and forwarding the second version of the data. The method also includes updating, by the processing device, the database to indicate that the second version of the data is to be locally served by the node that transmitted the write command.

Example 8 is the method of Example 7, wherein the first version of the data is a key-value pair that includes a key and a first value; and the second version of the data is a second version of the key-value pair that includes the key and a second value that is different from the first value.

Example 9 is the method of any of Examples 7-8, further comprising storing the second version of the data in a local memory; and transmitting a success message to the second node indicating that the second version of the data was stored in the local memory.

Example 10 is the method of any of Examples 7-9, wherein the write command is a first write command, and further comprising, prior to receiving the first write command: receiving a second write command from the first node, the second write command being for storing the first version of the data; in response to receiving the second write command, determining that the data is not being locally served by any node in the data grid by accessing the database; and updating the database to indicate that the first version of the data is to be locally served by the first node.

Example 11 is the method of Example 10, further comprising, subsequent to receiving the second write command and prior to receiving the first write command: storing the first version of the data in a local memory; and transmitting a success message to the first node indicating that the first version of the data was successfully stored in the local memory.

Example 12 is the method of any of Examples 7-11, wherein: locally serving the data comprises obtaining a version of the data from a local memory and serving the version of the data to a requester of the data; the processing device is included in a third node that is separate from the first node and the second node in the data grid; and the remote node is the first node or the third node.

Example 13 is the method of Example 12, further comprising receiving a read command from a fourth node in the data grid, the read command being for obtaining the second version of the data; in response to the read command, transmitting the second version of the data to the fourth node; and updating the database to indicate that the second version of the data is to be locally served by the fourth node.

Example 14 is a non-transitory computer-readable medium comprising instructions that are executable by a processing device. The instructions can cause the processing device to receive a write command from a node in a data grid, the write command being for storing a second version of data. The instructions can cause the processing device to, in response to receiving the write command, determine that a first version of the data is to be locally served by a first node in the data grid by accessing a database that includes a relationship between (i) the data and (ii) which node in the data grid is locally serving the data. The instructions can cause the processing device to, in response to determining that the first version of the data is to be locally served by the first node in the data grid, transmit a communication configured to cause the first node to switch from (i) a first setting in which the first node is configured to respond to a request for the data by locally serving the data, to (ii) a second setting in which the first node is configured to respond to the request for the data by obtaining the second version of the data from a remote node in the data grid and forwarding the second version of the data. The instructions can cause the processing device to update the database to indicate that the second version of the data is to be locally served by the node that transmitted the write command.

Example 15 is the non-transitory computer-readable medium of Example 14, wherein the first version of the data is a key-value pair that includes a key and a first value; and the second version of the data is a second version of the key-value pair that includes the key and a second value that is different from the first value.

Example 16 is the non-transitory computer-readable medium of any of Examples 14-15, further comprising instructions that are executable by the processing device for causing the processing device to store the second version of the data in a local memory; and transmit a success message to the second node indicating that the second version of the data was stored in the local memory.

Example 17 is the non-transitory computer-readable medium of any of Examples 14-16, wherein the write command is a first write command, and further comprising instructions that are executable by the processing device for causing the processing device to, prior to receiving the first write command: receive a second write command from the first node, the second write command being for storing the first version of the data; in response to receiving the second write command, determine that the data is not being locally served by any node in the data grid by accessing the database; and update the database to indicate that the first version of the data is to be locally served by the first node.

Example 18 is the non-transitory computer-readable medium of Example 17, further comprising instructions that are executable by the processing device for causing the processing device to, subsequent to receiving the second write command and prior to receiving the first write command: store the first version of the data in a local memory; and transmit a success message to the first node indicating that the first version of the data was successfully stored in the local memory.

Example 19 is the non-transitory computer-readable medium of any of Examples 14-18, wherein: locally serving the data comprises obtaining a version of the data from a local memory and serving the version of the data to a requestor of the data; the node is a first node in the data grid; the first node is a second node that is separate from the first node in the data grid; the processing device is included in a third node that is separate from the first node and the second node in the data grid; and the remote node is the first node or the third node.

Example 20 is the non-transitory computer-readable medium of Example 19, further comprising instructions that are executable by the processing device for causing the processing device to: receive a read command from a fourth node in the data grid, the read command being for obtaining the second version of the data; in response to the read command, transmit the second version of the data to the fourth node; and update the database to indicate that the second version of the data is to be locally served by the fourth node.

Example 21 is a data grid comprising a first node having a local memory on which a first version of data is stored. The data grid can include a second node configured to transmit a write command for storing a second version of the data. The data grid can include a third node configured to: receive the write command from the second node; in response to receiving the write command, determine that a first version of the data is to be locally served by the first node in the data grid by accessing a database that includes a relationship between (i) the data and (ii) which node in the data grid is locally serving the data; in response to determining that the first version of the data is to be locally served by the first node in the data grid, transmit a communication configured to cause the first node to switch from (i) a first setting in which the first node is configured to respond to a request for the data by locally serving the data, to (ii) a second setting in which the first node is configured to respond to the request for the data by obtaining the second version of the data from a remote node in the data grid and forwarding the second version of the data; and update the database to indicate that the second version of the data is to be locally served by the second node.

Example 22 is the data grid of Example 21, wherein the first version of the data is a key-value pair that includes a key and a first value; and the second version of the data is a second version of the key-value pair that includes the key and a second value that is different from the first value.

Example 23 is the data grid of any of Examples 21-22, wherein the second node is further configured to store the second version of the data in a local memory.

Example 24 is the data grid of any of Examples 21-23, wherein the third node is further configured to: locally store the second version of the data; and transmit a success message to the second node indicating that the second version of the data was locally stored.

Example 25 is the data grid of any of Examples 21-24, wherein the write command is a first write command, and the third node is further configured to, prior to receiving the first write command: receive a second write command from the first node, the second write command being for storing the first version of the data; in response to receiving the second write command, determine that the data is not being locally served by any node in the data grid by accessing the database; and update the database to indicate that the first version of the data is to be locally served by the first node.

Example 26 is the data grid of Example 25, wherein the third node is further configured to, subsequent to receiving the second write command and prior to receiving the first write command: store the first version of the data in a local memory; and transmit a success message to the first node indicating that the first version of the data was successfully stored in the local memory.

Example 27 is the data grid of any of Examples 21-26, wherein the third node is further configured to: receive a read command from a fourth node in the data grid, the read command being for obtaining the second version of the data; in response to the read command, transmit the second version of the data to the fourth node; and update the database to indicate that the second version of the data is to be locally served by the fourth node.

Example 28 is the data grid of any of Examples 21-27, wherein: locally serving the data comprises obtaining a version of the data from a local memory and serving the version of the data to a requestor of the data; and the remote node is the first node or the third node.

Example 29 is a system comprising a first means for receiving a write command from a node in a data grid, the write command being for storing a second version of data. The system can also include a second means for, in response to receiving the write command, determining that a first version of the data is to be locally served by a first node in the data grid by accessing a database that includes a relationship between (I) the data and (ii) which node in the data grid is locally serving the data. The system can also include a third means for, in response to determining that the first version of the data is to be locally served by the first node in the data grid, transmitting a communication configured to cause the first node to switch from (i) a first setting in which the first node is configured to respond to a request for the data by locally serving the data, to (ii) a second setting in which the first node is configured to respond to the request for the data by obtaining the second version of the data from a remote node in the data grid and forwarding the second version of the data. The system can also include a fourth means for updating the database to indicate that the second version of the data is to be locally served by the node that transmitted the write command.

Example 30 is the system of Example 29, the first version of the data is a key-value pair that includes a key and a first value; and the second version of the data is a second version of the key-value pair that includes the key and a second value that is different from the first value.

Example 31 is the system of any of Examples 29-30, wherein a means is configured for: storing the second version of the data in a local memory; and transmitting a success message to the second node indicating that the second version of the data was stored in the local memory.

Example 32 is the system of any of Examples 29-31, wherein the write command is a first write command, and wherein a means is configured for, prior to receiving the first write command: receiving a second write command from the node, the second write command being for storing the first version of the data; in response to receiving the second write command, determining that the data is not being locally served by any node in the data grid by accessing the database; and updating the database to indicate that the first version of the data is to be locally served by the first node.

Example 33 is the system of Example 32, wherein a means is configured for, subsequent to receiving the second write command and prior to receiving the first write command: storing the first version of the data in a local memory; and transmitting a success message to the node indicating that the first version of the data was successfully stored in the local memory.

Example 34 is the system of any of Examples 29-33, wherein a means is configured for: receiving a read command from a fourth node in the data grid, the read command being for obtaining the second version of the data; in response to the read command, transmitting the second version of the data to the fourth node; and updating the database to indicate that the second version of the data is to be locally served by the fourth node.

Example 35 is the system of any of Examples 29-34, wherein the first means, second means, third means, and fourth means are the same processing device.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s).

The invention claimed is:

1. A data grid comprising:
a first node configured to receive a communication and responsively switch from (i) a first setting in which the first node is configured to respond to a request for data from a client device by locally serving a first version of the data to the client device, to (ii) a second setting in which the first node is configured to respond to the request for the data from the client device by obtaining a second version of the data from a remote node in the data grid and forwarding the second version of the data to the client device;
a second node that is remote from the first node; and
a third node that is remote from the first node and the second node, the third node including:
a processing device; and
a memory device on which instructions executable by the processing device are stored for causing the processing device to:
receive a write command from the second node for storing the second version of the data in the data grid; and
in response to receiving the write command:
determine, based on information in a database, that the first node in the data grid is configured to locally serve the first version of the data, wherein the information in the database specifies which node in the data grid is configured to locally serve the data;
in response to determining that the first node is configured to locally serve the first version of the data, transmit the communication for causing the first node to switch from the first setting to the second setting; and
update the database to indicate that the second version of the data is to be locally served by the second node.

2. The data grid of claim 1, wherein:
the first version of the data is a key-value pair that includes a key and a first value; and
the second version of the data is a second version of the key-value pair that includes the key and a second value that is different from the first value.

3. The data grid of claim 1, wherein the memory device further comprises instructions that are executable by the processing device for causing the processing device to:
store the second version of the data in a local memory; and
transmit a success message to the second node indicating that the second version of the data was stored in the local memory.

4. The data grid of claim 1, wherein the write command is a second write command, and wherein the memory device further comprises instructions that are executable by the processing device for causing the processing device to, prior to receiving the second write command:
receive a first write command from the first node, the first write command being for storing the first version of the data;
in response to receiving the first write command, determine that the data is not being locally served by any node in the data grid by accessing the database; and update the database to indicate that the first version of the data is to be locally served by the first node.

5. The data grid of claim 4, wherein the memory device further comprises instructions that are executable by the processing device for causing the processing device to, subsequent to receiving the first write command and prior to receiving the second write command:
store the first version of the data in a local memory; and
transmit a success message to the first node indicating that the first version of the data was successfully stored in the local memory.

6. The data grid of claim 1, wherein:
the remote node is the second node or the third node.

7. The data grid of claim 1, wherein the database specifies that a plurality of nodes in the data grid are configured to locally serve a plurality of pieces of data, wherein the plurality of nodes are different from one another and the plurality of pieces of data are different from one another.

8. The data grid of claim 1, wherein the memory device further comprises instructions that are executable by the processing device for causing the processing device to update the database to indicating that the second version of the data is to be locally served by the second node by:
modifying the database from (i) indicating that the first version of the data is to be locally served by the first node to (ii) indicating that the second version of the data is to be locally served by the second node.

9. A method implemented by a third node in a data grid that also includes a first node and a second node, the third node being remote from the first node and the second node in the data grid, the first node being configured to receive a communication and responsively switch from (i) a first setting in which the first node is configured to respond to a request for data from a client device by locally serving a first version of the data to the client device to (ii) a second setting in which the first node is configured to respond to the request for the data from the client device by obtaining a second version of the data from a remote node in the data grid and forwarding the second version of the data to the client device, the method comprising:
receiving, by a processing device of the third node, a write command from the second node for storing a second version of the data in the data grid; and
in response to receiving the write command:
determining, by the processing device of the third node and based on information in a database, that the first node in the data grid is configured to locally serve the first version of the data, wherein the information in the database specifies which node in the data grid is configured to locally serve the data;
in response to determining that the first node is configured to locally serve the first version of the data, transmitting, by the processing device of the third node, the communication for causing the first node to switch from the first setting to the second setting; and
updating, by the processing device of the third node, the database to indicate that the second version of the data is to be locally served by the second node.

10. The method of claim 9, further comprising:
storing, by the processing device of the third node, the second version of the data in a local memory; and
transmitting, by the processing device of the third node, a success message to the second node indicating that the second version of the data was stored in the local memory.

11. The method of claim 9, wherein the write command is a second write command, and further comprising, prior to receiving the second write command:
receiving a first write command from the first node, the first write command being for storing the first version of the data;
in response to receiving the first write command, determining that the data is not being locally served by any node in the data grid by accessing the database; and
updating the database to indicate that the first version of the data is to be locally served by the first node.

12. The method of claim 11, further comprising, subsequent to receiving the first write command and prior to receiving the second write command:
storing the first version of the data in a local memory; and
transmitting a success message to the first node indicating that the first version of the data was successfully stored in the local memory.

13. The method of claim 9, wherein:
the remote node is the second node or the third node.

14. The method of claim 13, further comprising:
receiving a read command from a fourth node in the data grid, the read command being for obtaining the second version of the data;
in response to the read command, transmitting the second version of the data to the fourth node; and
updating the database to indicate that the second version of the data is to be locally served by the fourth node.

* * * * *